US008147620B2

(12) United States Patent
Tafoya

(10) Patent No.: US 8,147,620 B2
(45) Date of Patent: Apr. 3, 2012

(54) APPARATUS FOR REMOVING WATER-SOLUBLE SUPPORT MATERIAL FROM ONE OR MORE RAPID PROTOTYPE PARTS

(76) Inventor: David Jonathan Tafoya, Maple Grove, MN (US)

( * ) Notice: Subject to any disclaimer, the term of this patent is extended or adjusted under 35 U.S.C. 154(b) by 353 days.

(21) Appl. No.: 12/387,591

(22) Filed: May 4, 2009

(65) Prior Publication Data

US 2009/0211616 A1 Aug. 27, 2009

Related U.S. Application Data

(63) Continuation-in-part of application No. 10/991,679, filed on Nov. 18, 2004, now Pat. No. 7,546,841.

(60) Provisional application No. 60/523,776, filed on Nov. 19, 2003.

(51) Int. Cl.
*B08B 3/04* (2006.01)
(52) U.S. Cl. ........ 134/56 R; 134/113; 134/108; 134/186
(58) Field of Classification Search ................ 134/56 R, 134/113, 105, 108, 111, 186
See application file for complete search history.

(56) References Cited

U.S. PATENT DOCUMENTS

| | | | | |
|---|---|---|---|---|
| 1,545,979 A | * | 7/1925 | Rosenberg | 134/104.4 |
| 1,739,695 A | * | 12/1929 | Slauter | 126/377.1 |
| 2,651,311 A | * | 9/1953 | Rule | 134/89 |
| 3,054,411 A | | 9/1962 | Randall | |
| 3,319,638 A | * | 5/1967 | Ellison | 134/107 |
| 3,863,657 A | * | 2/1975 | Irving | 134/57 D |
| 4,197,016 A | * | 4/1980 | Winterhalter et al. | 366/165.5 |
| 4,474,198 A | | 10/1984 | Greenfield, Jr. et al. | |
| 4,773,436 A | | 9/1988 | Cantrell et al. | |
| 4,818,303 A | * | 4/1989 | Cole | 148/711 |
| 4,867,186 A | * | 9/1989 | Otsuka | 134/111 |
| 5,386,841 A | * | 2/1995 | Stilwagen et al. | 134/57 R |

(Continued)

FOREIGN PATENT DOCUMENTS

JP 02-174662 * 7/1990

OTHER PUBLICATIONS

European Patent Office 0 481 474 Apr. 1992.*

*Primary Examiner* — Frankie L Stinson
(74) *Attorney, Agent, or Firm* — Michael A Mochinski

(57) ABSTRACT

The support removal apparatus comprising in combination a retention tank having a manifold assembly comprising a plurality of nozzle heads, articulating arms or a combination of both in hydraulic communication with the discharge side of a pump, collectively configured for agitating an aqueous cleaning solution; a heating element mounted within the retention tank for heating the aqueous cleaning solution to a predetermined temperature set point; a basket strainer mounted within the retention tank in hydraulic communication with the intake side of the pump to mitigate passage of small rapid prototype parts and residual support material therethrough and into the pump and manifold assembly; a thermocouple for maintaining the temperature within a tolerable range for optimum removal of support material; a level indicator to ensure adequate solution level in the retention tank for operability of the pump and heating element; a cabinet having an interface controller mounted on an exterior panel thereof for setting timer and heat functions; and a microprocessor having capabilities for making minute adjustments to the heating element via feedback from the thermocouple and controlling operation of the pump and heating element for a pre-set time interval.

29 Claims, 15 Drawing Sheets

U.S. PATENT DOCUMENTS

| | | | |
|---|---|---|---|
| 5,419,352 A * | 5/1995 | Johnson | 134/102.1 |
| 5,485,858 A * | 1/1996 | Schmidt | 134/107 |
| 5,660,194 A | 8/1997 | Sanders | |
| 5,927,309 A | 7/1999 | Hoover et al. | |
| 6,109,277 A | 8/2000 | Linton et al. | |
| 6,115,541 A | 9/2000 | Rhodes | |
| 6,119,706 A | 9/2000 | Foederl et al. | |
| 6,279,587 B1 | 8/2001 | Yamamoto | |
| 2002/0108638 A1 | 8/2002 | Bigott | |
| 2009/0205682 A1 | 8/2009 | Tafoya | |

* cited by examiner

APPARATUS FOR REMOVING WATER-SOLUBLE SUPPORT MATERIAL FROM ONE OR MORE RAPID PROTOTYPE PARTS

CROSS-REFERENCE TO RELATED APPLICATIONS

This application is a continuation-in-part of U.S. patent application Ser. No. 10/991,679, entitled "APPARATUS AND METHOD OF REMOVING WATER SOLUBLE SUPPORT MATERIAL FROM A RAPID PROTOTYPE PART" filed Nov. 18, 2004 now U.S. Pat. No. 7,546,841, which claims the benefit of priority from U.S. Provisional Application Ser. No. 60/523,776 filed Nov. 19, 2003, entitled "APPARATUS AND METHOD OF REMOVING WATER SOLUBLE SUPPORT MATERIAL FROM A RAPID PROTOTYPE PART," the disclosures of which, including all attached documents, are incorporated herein by reference in their entirety for all purposes.

FIELD OF THE INVENTION

The present invention relates in general to an improved apparatus and method of removing water-soluble support material from a rapid prototype part. More particularly, the present invention relates to an improved apparatus comprising means for heating and agitating an aqueous cleaning solution for accelerated, efficient dissolving of temporary support material generally utilized in the production of rapid prototype parts.

BACKGROUND OF THE INVENTION

Fused Deposition Modeling (FDM) is one method among a few capable of developing rapid prototype parts or functional models from a thermoplastic material such as ABS (acrylonitrile butadiene styrene) and polycarbonate. FDM utilizes a computer numeric controlled (CNC) extruder-head which squeezes a fine filament of melted thermoplastic through a modeler nozzle. The controller, operating in accord with pre-select, known variables, activates the modeler nozzle to deposit heated plastic layer-by-layer to form the desired geometric shape. In some instances where select features of the part are left unsupported as a result of the part's orientation, the FDM-based machine may incorporate the use of a second nozzle for extruding therethrough support material to create support structures for any cantilevered portions of the part. In cases where the part's build comprises small, intricate features, a water-soluble support material may be used to further facilitate or ease removal from the part's build upon completion. Once the appropriate supporting layer is built, thermoplastic, as discussed above, is extruded through the modeler nozzle to form the part's build. Once the part has finished its successive layers and the build is complete, the part is removed from the FDM-based machine for inspection and final surface preparation, which may include removal of any support material, additional machining, and/or application of a finish coating material.

In instances where a water-soluble support material is used, the art offers a range of techniques for removing the support material from the rapid prototype part. One such technique may simply involve immersing the part in a suitable solvent repeatedly via manual or automated means and manually removing the support material using a brush or a pointed tool. Another technique commonly employed in the art may involve placement within a conventional immersion parts washer of the type generally designed to remove grease, carbon, resins, tar, and other unwanted petroleum-based residuals from automotive parts and machine shop equipment. Typically, the conventional immersion parts washer of this type may comprise operable features of ultrasonics to facilitate the cleansing action of the solvent. Although the operable feature noted above may or may not adequately address the removal of support material, the conventional immersion parts washer can be costly in terms of purchase, maintenance and operation, particularly for this limited purpose, and inappropriate in a variety of environmental settings. Given that most machinery having rapid prototype part making capabilities is operated from within an office setting or a similarly suited environment, the coinciding use of a conventional immersion parts washer makes it unacceptable and inappropriate in maintaining a sound, clean environment. Further, some conventional immersion parts washer may expose one to unacceptable health risks, particularly those having ultrasonic capabilities (see *World Health Organization Report on Ultrasound and Ultrasonic Noise*, Geneva 1982).

Accordingly, there remains a need for a dedicated apparatus capable of removing water soluble support material from a rapid prototype part and operating side-by-side with a rapid prototype part making machine commonly placed and operated in an office setting or a similarly suited environment.

BRIEF SUMMARY OF THE INVENTION

In order to overcome the numerous drawbacks apparent in the prior art, an improved support material removal apparatus has been devised for use with a rapid prototype part making machine, specifically of the type having Fused Deposition Modeling (FDM) capabilities.

It is thus an object of the present invention to provide a low cost, non-complicated support material removal apparatus which may be reliably used in lieu of a conventional immersion parts washer dedicated and known in the art to remove grease, carbon, resins, tar, and other unwanted residuals from automotive parts and machine shop equipment.

It is another object of the present invention to provide such a support material removal apparatus which incorporates means for heating and agitating an aqueous cleaning solution for accelerated, efficient dissolving of support material generally utilized in the production of rapid prototype parts.

It is another object of the present invention to provide such a support material removal apparatus which possesses a minimal number of operating components to ensure sustained, reliable operation throughout its duration of use.

It is yet another object of the present invention to provide such a support material removal apparatus which is portable and operable independent of a rapid prototype part making machine.

It is yet another object of the present invention to provide such a support material removal apparatus which comprises process controller means for setting applicable set points for unattended operation.

It is yet another object of the present invention to provide such a support material removal apparatus which accommodates a variety of part shapes and sizes to afford versatility and flexibility to the operator in removing support material from rapid prototype parts and the like having unique geometric profiles.

It is yet another object of the present invention to provide such a support material removal apparatus which can be accommodated within the spatial requirements or foot print of most equipment generally observed and used in an office setting.

It is yet another object of the present invention to provide such a support material removal apparatus which is readily accessible for purposes of setup and adjustment and maintenance and repair without sustaining substantial operating downtimes.

It is yet another object of the present invention to provide such a support material removal apparatus which is suited to reach the interstitial areas and spaces of the rapid prototype part for more effective and thorough removal of water-soluble support material therefrom.

It is yet another object of the present invention to provide such a support material removal apparatus which accomplishes the foregoing and other objects and advantages and which is economical, durable, and fully effective in performing its intended functions.

In accordance with the present invention, a support material removal apparatus has been devised for use with a rapid prototype part making machine, the apparatus comprising in combination a retention tank having a manifold assembly comprising a plurality of nozzle heads or articulating arms or a combination of both in hydraulic communication with the discharge side of a pump, collectively configured for agitating an aqueous cleaning solution; a heating element mounted within the retention tank for heating the aqueous cleaning solution to a predetermined temperature set point; a basket strainer mounted within the retention tank in hydraulic communication with the intake side of the pump to mitigate passage of small rapid prototype parts and residual support material therethrough and into the pump and manifold assembly; a work surface mounted atop the retention tank and having a movable lid fitted with a basket for containing small rapid prototype parts; a thermocouple for maintaining the temperature within a tolerable range for optimum removal of support material; a level indicator to ensure adequate solution level in the retention tank for operability of the pump and heating element; a cabinet having interface controller mounted on an exterior panel thereof for setting timer and heat functions; and a microprocessor having capabilities for making minute adjustments to the heating element via feedback from the thermocouple and controlling operation of the pump and heating element for a pre-set time interval.

Other objects, features, and advantages of the present invention will become apparent in the following detailed description of the preferred embodiments thereof when read in conjunction with the accompanying drawings in which like reference numerals depict the same parts in the various views.

BRIEF DESCRIPTION OF THE SEVERAL VIEWS OF THE DRAWINGS

A preferred embodiment of the present invention will now be described by way of example with reference to the accompanying drawings, in which.

DETAILED DESCRIPTION OF THE PREFERRED EMBODIMENT

Figure 1:
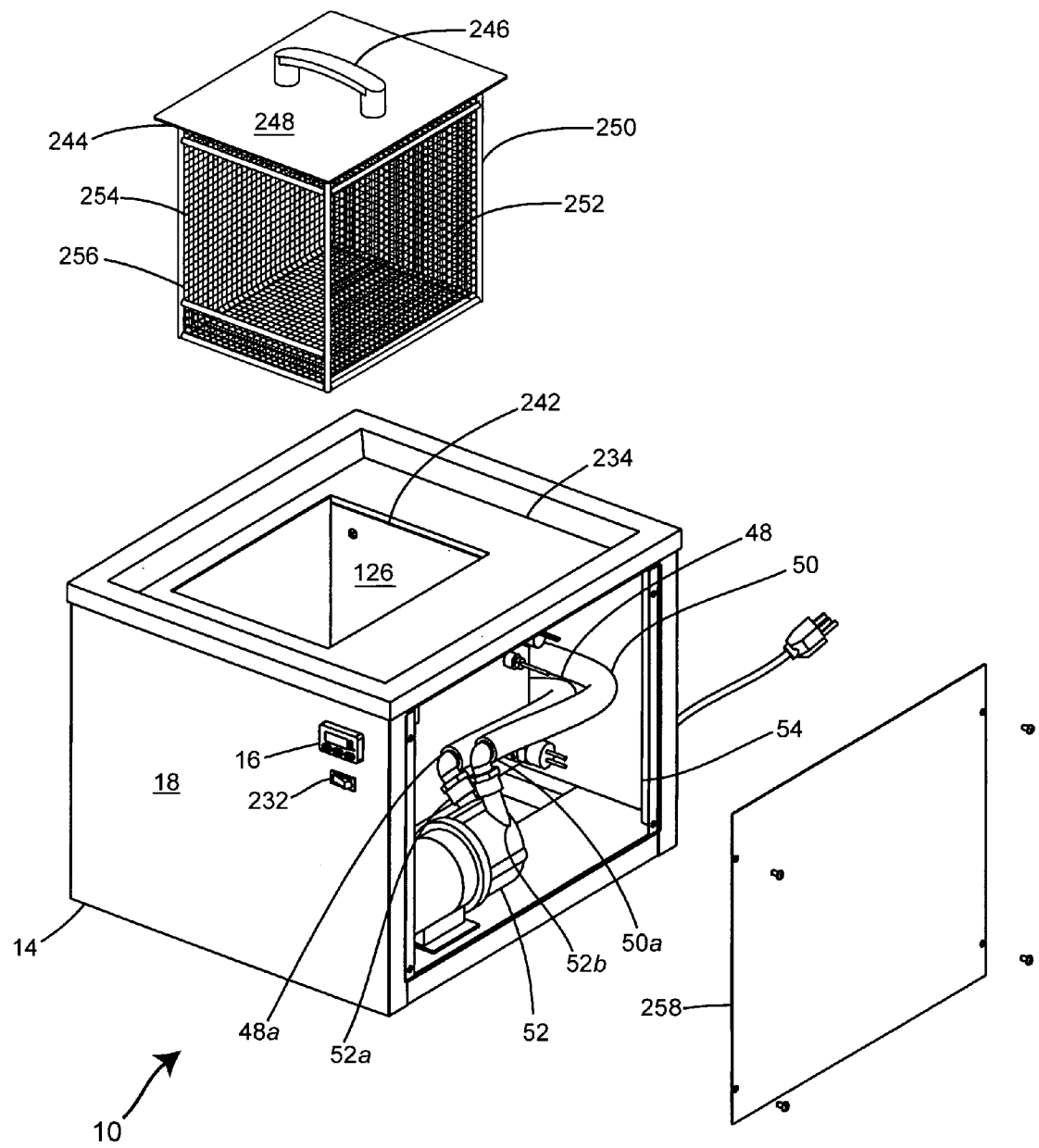
FIG. 1 is a perspective view of the preferred embodiment of the present invention illustrating a support removal apparatus equipped with a basket.

While this invention is susceptible of being embodied in many different forms, the preferred embodiment of the invention is illustrated in the accompanying drawings and described in detail hereinafter with the understanding that the present disclosure is to be considered to exemplify the principles of the present invention and is not intended to limit the invention to the embodiments illustrated and presented herein. The present invention has particular utility as an apparatus for removing water-soluble supports from one or more rapid prototype parts produced from a rapid prototype part making machine such as those that incorporate Fused Deposition Modeling (FDM) technology as well as other known available technologies in the art.

Referring now to FIGS. 1-5, there is shown generally at 10 a support removal apparatus comprising a tank assembly 12 having means for heating and directionally emitting an aqueous cleaning solution and a cabinet 14 having an interface controller 16 mounted on an exterior panel 18 thereof for temporally controlling heat and agitation outputs. The aqueous cleaning solution particularly suited for this application comprises a mixture of 0.5-1.5 ounces of sodium hydroxide and one gallon water, which is shown effective in removing water soluble support material from one or more rapid prototype parts 19 within a tolerable temperature range noted hereinafter. Other alkaline-based cleaning solutions are equally suited for this application, including a mixture of 25-70 weight percent sodium or potassium hydroxide and 5-30 weight percent sodium or potassium carbonate, collectively forming a granular sodium or potassium composition suitable for mixing with water. In this regard, the aqueous cleaning solution comprises a concentration ratio of 1.05 pounds of granular sodium or potassium composition per one gallon of water.

Figure 2:
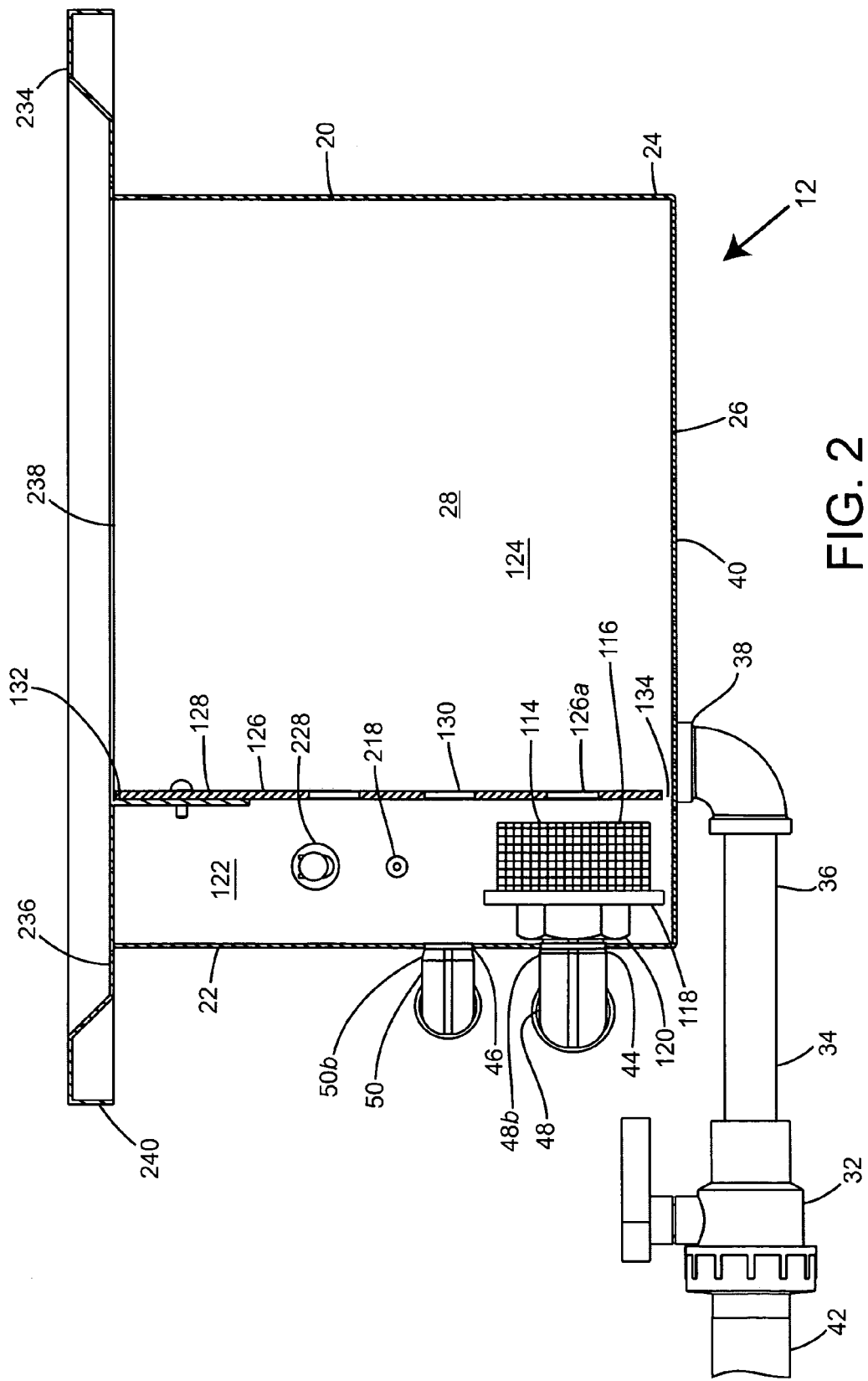
FIG. 2 is a side cross sectional view of the preferred embodiment of the present invention taken on line 2-2 of FIG. 3 illustrating a manifold assembly and strainer basket situated within an interior chamber.
Figure 3:
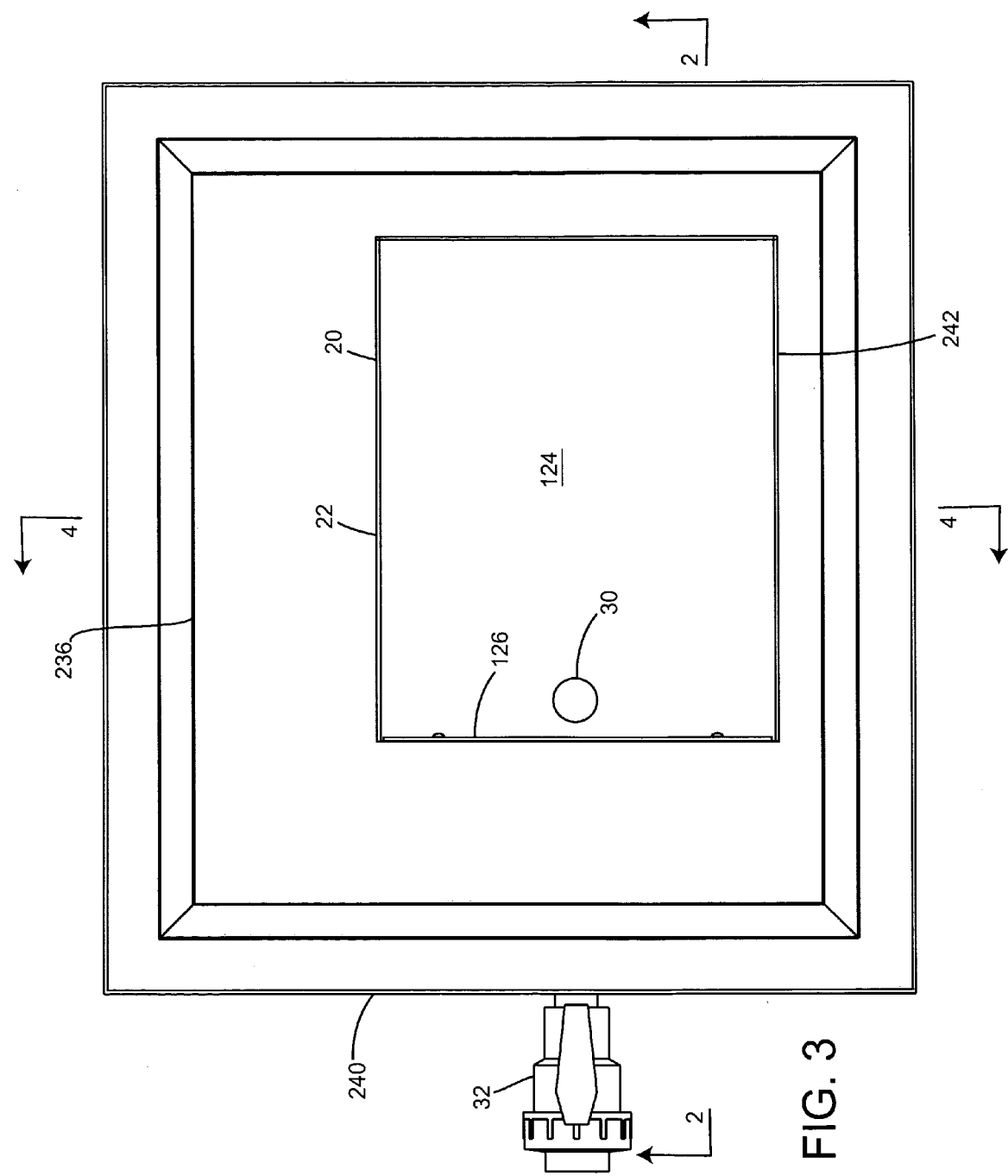
FIG. 3 is a top view of the preferred embodiment of the present invention illustrating a work surface mounted to a retention tank.

The tank assembly 12, as shown in FIGS. 2 and 3, comprises a retention tank 20 having walls 22 substantially arranged and connected to one another to form a box-like structure having an upper peripheral portion 23 fixedly fitted with an outward extending flange 23a and a bottom peripheral portion 24 fixedly attached to and along the perimeter of a base 26, collectively forming an interior chamber 28 for containing and holding the aqueous cleaning solution. In the preferred embodiment, an aperture 30 extending through the base primarily serves as means for removing aqueous cleaning solution from the interior chamber for purposes of repair and maintenance and like activities. Retention of aqueous cleaning solution in the interior chamber 28 as well as removal therefrom and through the aperture is principally controlled by a valve 32 connected in line to a drain pipe 34 having an input end 36 threadably connected to a drain sleeve 38 mounted to and over the aperture at an exterior side 40 of the base and an output end 42 terminating at an external waste line or sump collector.

As shown in FIGS. 1 and 2, one wall 22 of the retention tank preferably comprises intake and outlet apertures 44, 46 for passage of intake and outlet piping 48, 50, respectively, each having first ends 48a, 50a attached to intake and outlet sides 52a, 52b of a pump 52 mounted exterior to the retention tank and housed within an interior portion 54 of the cabinet. Pumps most suited for this application comprise of types having centrifugal or magnetic operable means, to name a couple known in the art to possess favorable characteristics to hydraulically convey and circulate aqueous cleaning solution in and through the retention tank 20. However, regardless of the pump type used, pump seals as well as other operable components thereof are preferably fabricated from materials which are compatible for use in a corrosive, caustic environment given the alkalinity of the aqueous cleaning solution. Accordingly, seals made from ethylene propylene diene monomer (EPDM) or Viton™ and metallic components made from stainless steel tolerably perform well within the predetermined range of operation (temperature and pH) without deleterious impact to pump performance.

Figure 6:
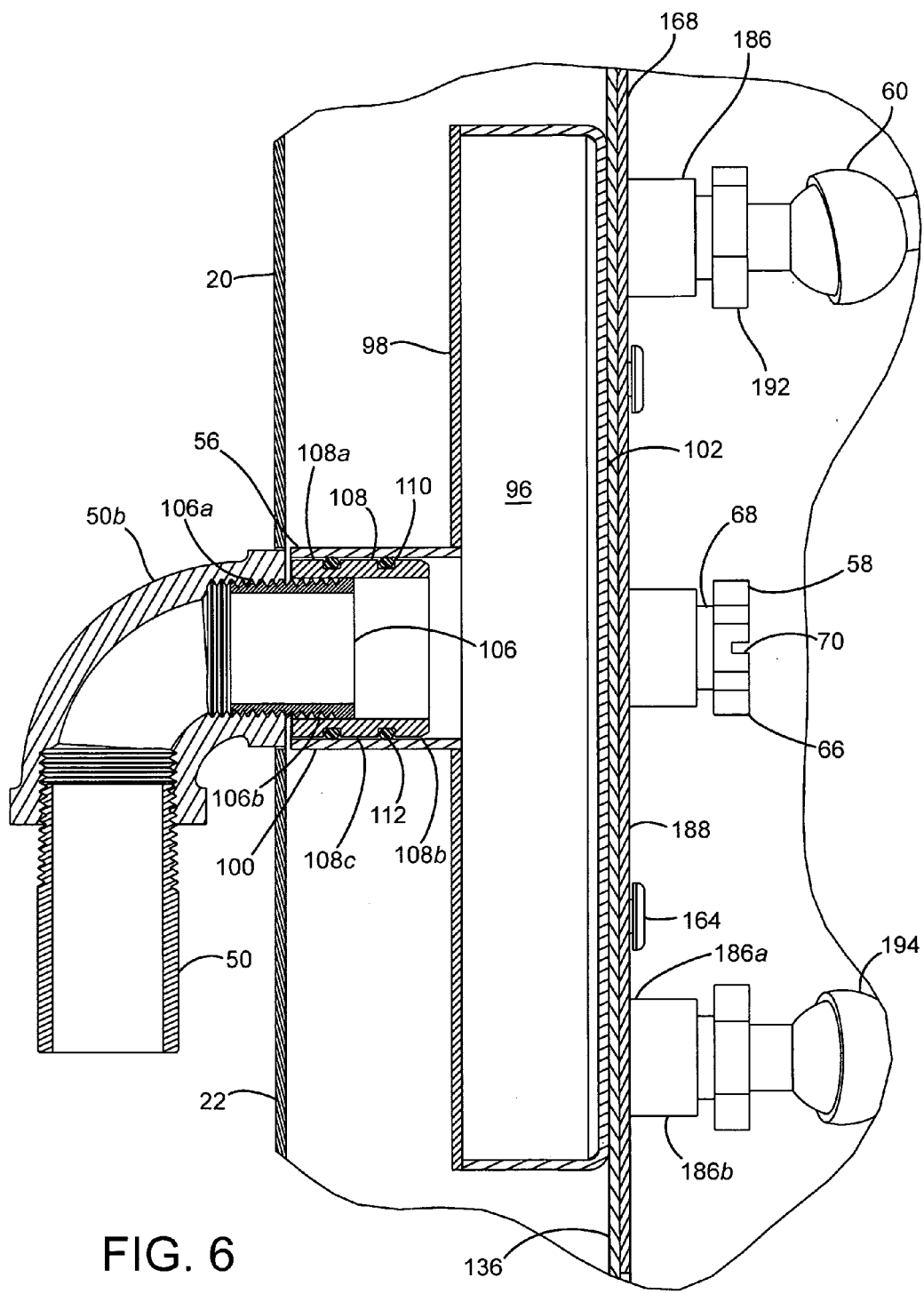
FIG. 6 is a partial side cross sectional view of the preferred embodiment of the present invention illustrating a nozzle head and tip threadably attached to a coupling.
Figure 7:
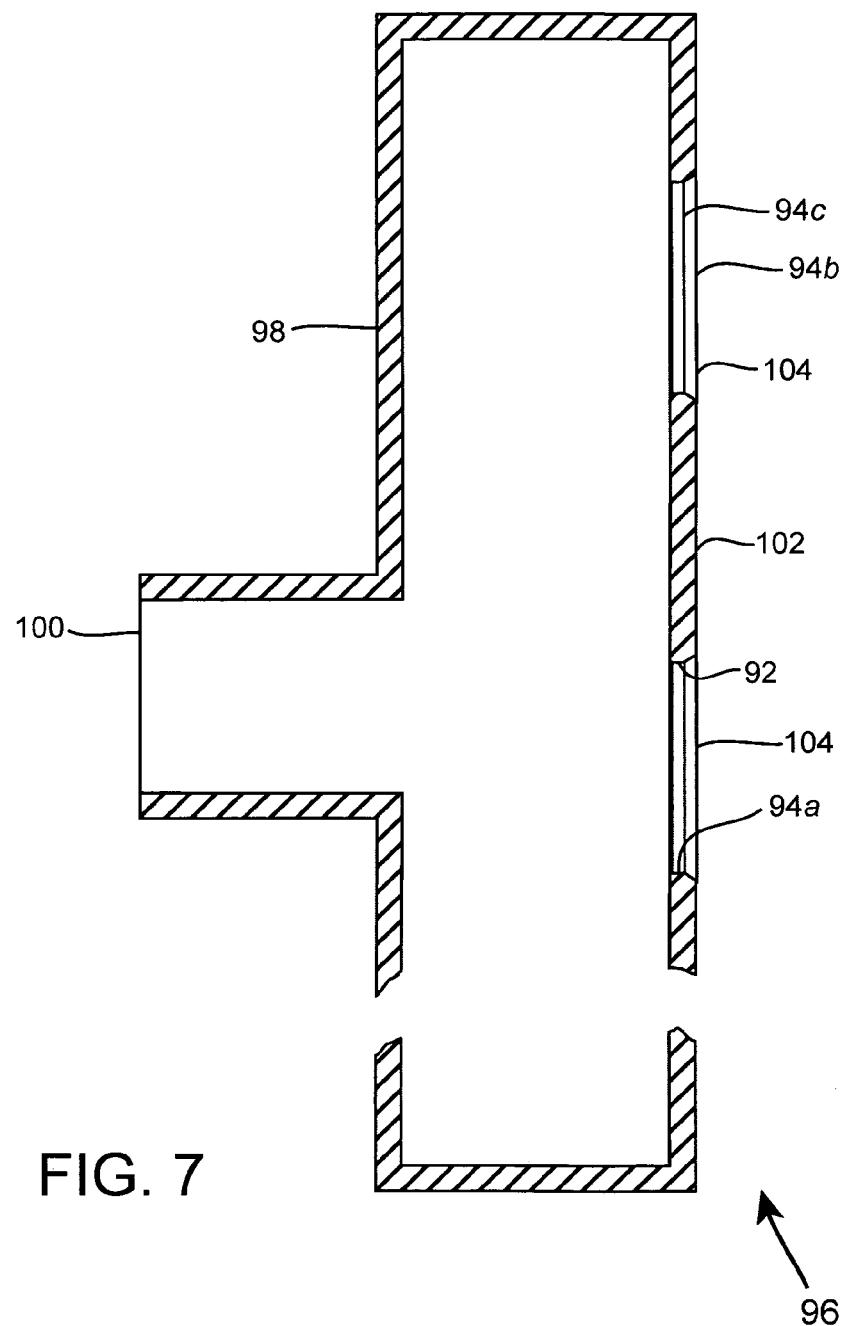
FIG. 7 is a partial side cross sectional view of the preferred embodiment of the present invention illustrating an articulating arm threadably attached to a threaded coupling.

As depicted in FIG. 2, a second end 50b of the outlet piping 50 is adaptably connected to a manifold assembly 56 that conjunctively functions with directionally emitting means to agitate the aqueous cleaning solution contained within the retention tank. In a preferred configuration of directionally emitting means as incorporated into the manifold assembly, particularly as shown in FIGS. 6 and 7, at least one nozzle head 58 or an articulating arm 60 is threadably mounted to the second end of the outlet piping via a threaded coupling 62 insofar to establish its position beyond one of the walls of the retention tank and inwardly within the interior chamber.

Figure 4:
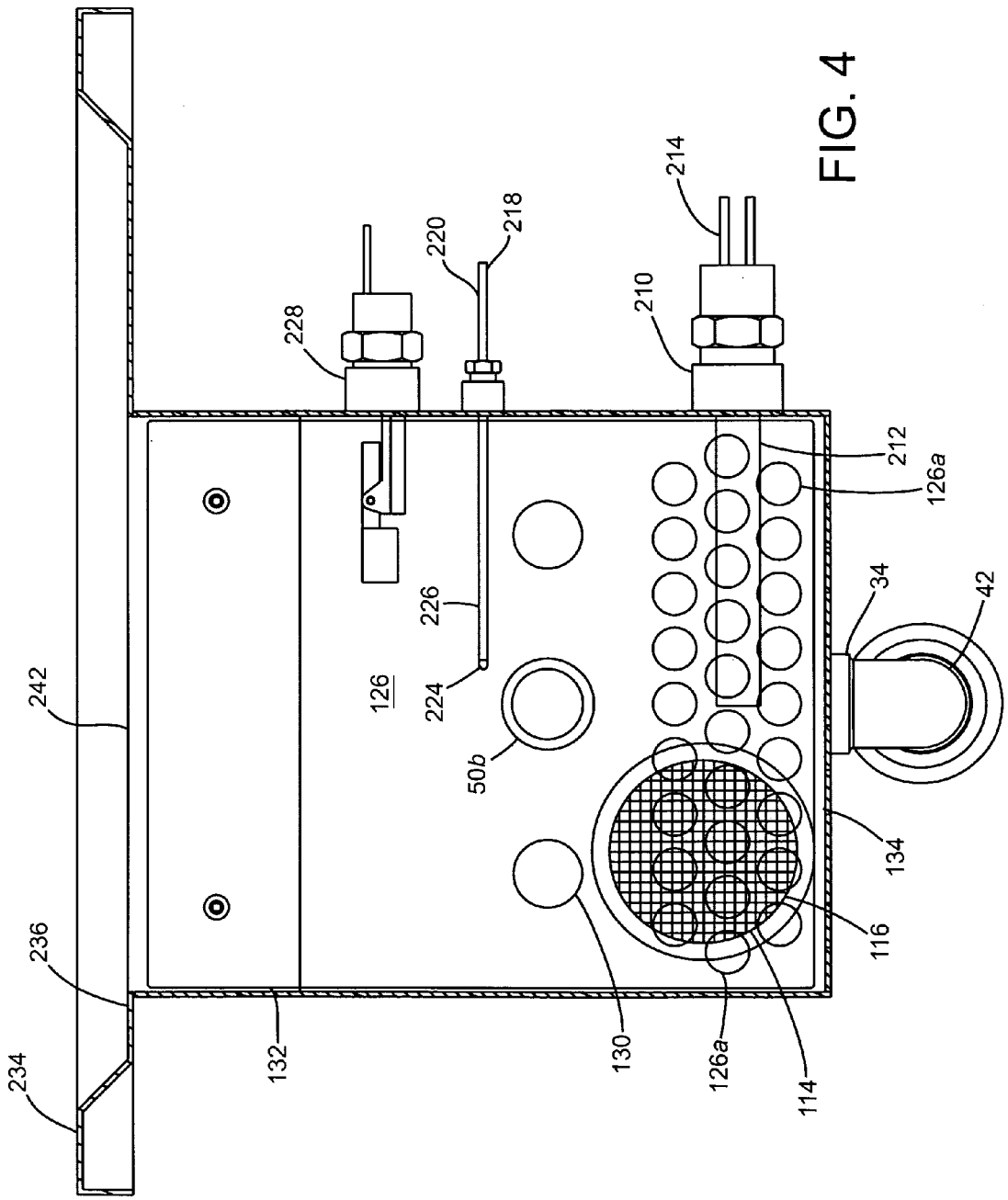
FIG. 4 is a side cross sectional view of the preferred embodiment of the present invention taken on line 4-4 of FIG. 3 illustrating a strainer basket and a manifold assembly.

In a first alternative configuration of directionally emitting means as incorporated into the manifold assembly, specifically as shown in FIG. 4 to utilize more than one nozzle head, articulating arm or a combination of both, the manifold assembly is further configured with a pipe tree fitting 64 having a feed end 64a fixedly attached to the second end 50b of the outlet piping and more than one branch ends 64b extending therefrom to evenly distribute the incoming flow into an equivalent number of nozzle heads 58 and/or articulating arms 60. In some instances, it may be beneficial or even desirable to selectively arrange about the retention tank 20 and incorporate therefor one or more manifold assemblies in this noted arrangement to provide for opposing, cross interaction of flows from each nozzle head, particularly in such manner to achieve the desired level of agitation or turbulence within and throughout the interior chamber 28. As means of furthering this configuration, the outlet piping may be supplemented with any number appropriate fittings of the type available in the art and connected to any number of pipe tree fittings 64 that have multiple branch ends 64b fitted with the aforementioned nozzle heads 58 and/or articulating arms 60.

In reference to FIGS. 2 and 4, each nozzle head is preferentially shown to comprise a nozzle tip 66 and a threaded body section 68 suited to threadably engage each branch end 64b and threaded coupling 62. In order to develop and continually establish a predominate level of agitation within the interior chamber, each nozzle tip is suitably configured with an orifice 70 having a diameter ranging from 0.05 to 0.625". In this diametric range, combined with a pump capacity ranging from 3-30 gallons per minute at a power output ranging $\frac{1}{25}$-2 HP, each nozzle tip 66 is substantially capable of developing an output pressure ranging from 5 to 60 p.s.i., respectively. Accordingly, each nozzle tip provides for a jet stream having a tight dispersion pattern capable of reaching and interacting with and reflecting off the opposing wall of the retention tank 20 to uniformly agitate the aqueous cleaning solution within the interior chamber. In instances where the retention tank comprises a larger volumetric capacity, more than one manifold assembly 56, as configured above, may be needed to create and maintain homogenous agitation of the aqueous cleaning solution for sustained and continued removal of support material from one or more rapid prototype parts.

Figure 8:
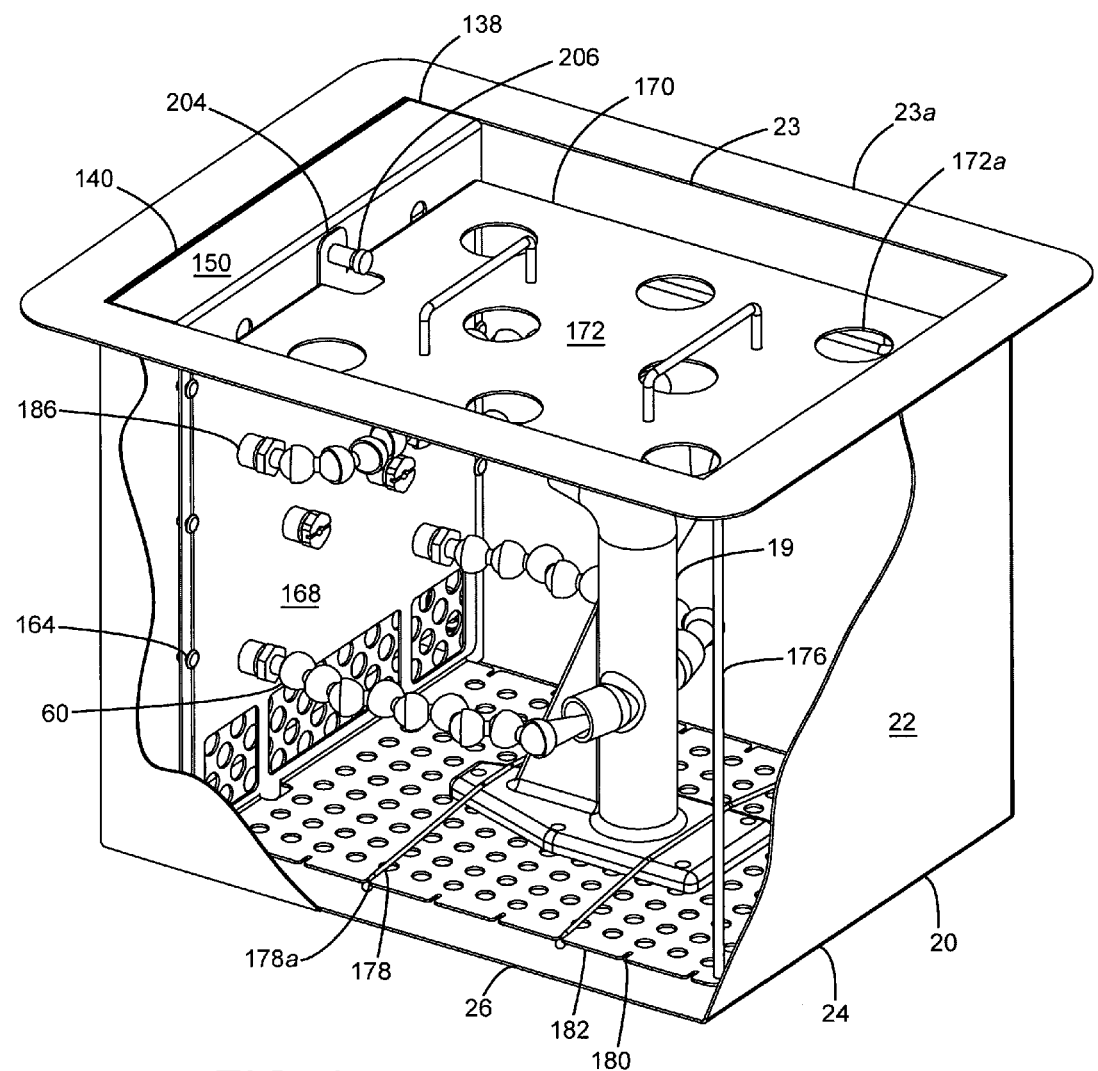
FIG. 8 is a side cross sectional view of the preferred embodiment of the present invention illustrating an alternative manifold assembly having an elongate tubular member.
Figure 9:
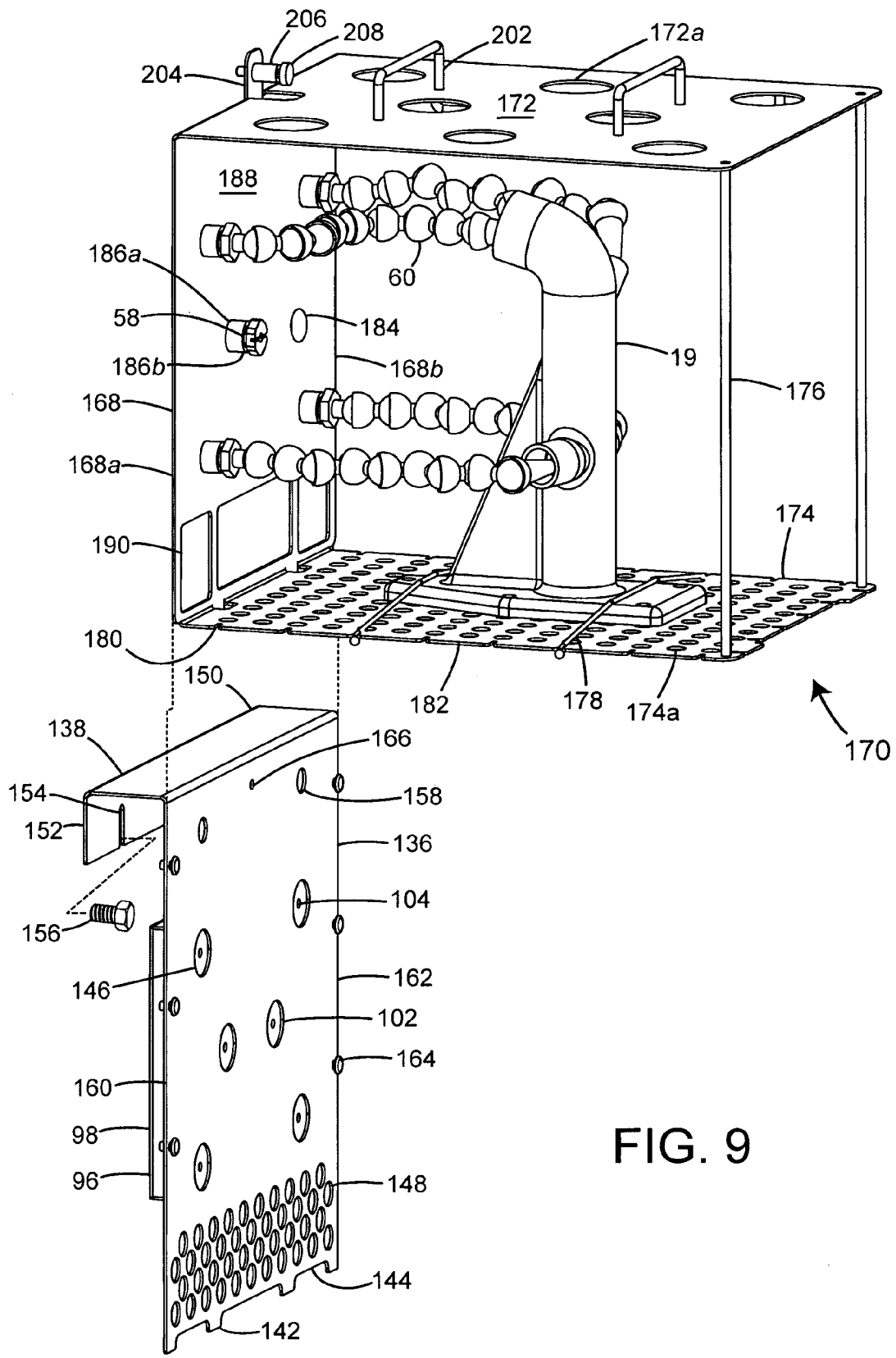
FIG. 9 is a side cross sectional view of the preferred embodiment of the present invention illustrating an alternative manifold assembly having an elongate tubular member connected to an inlet fitting.
Figure 10:
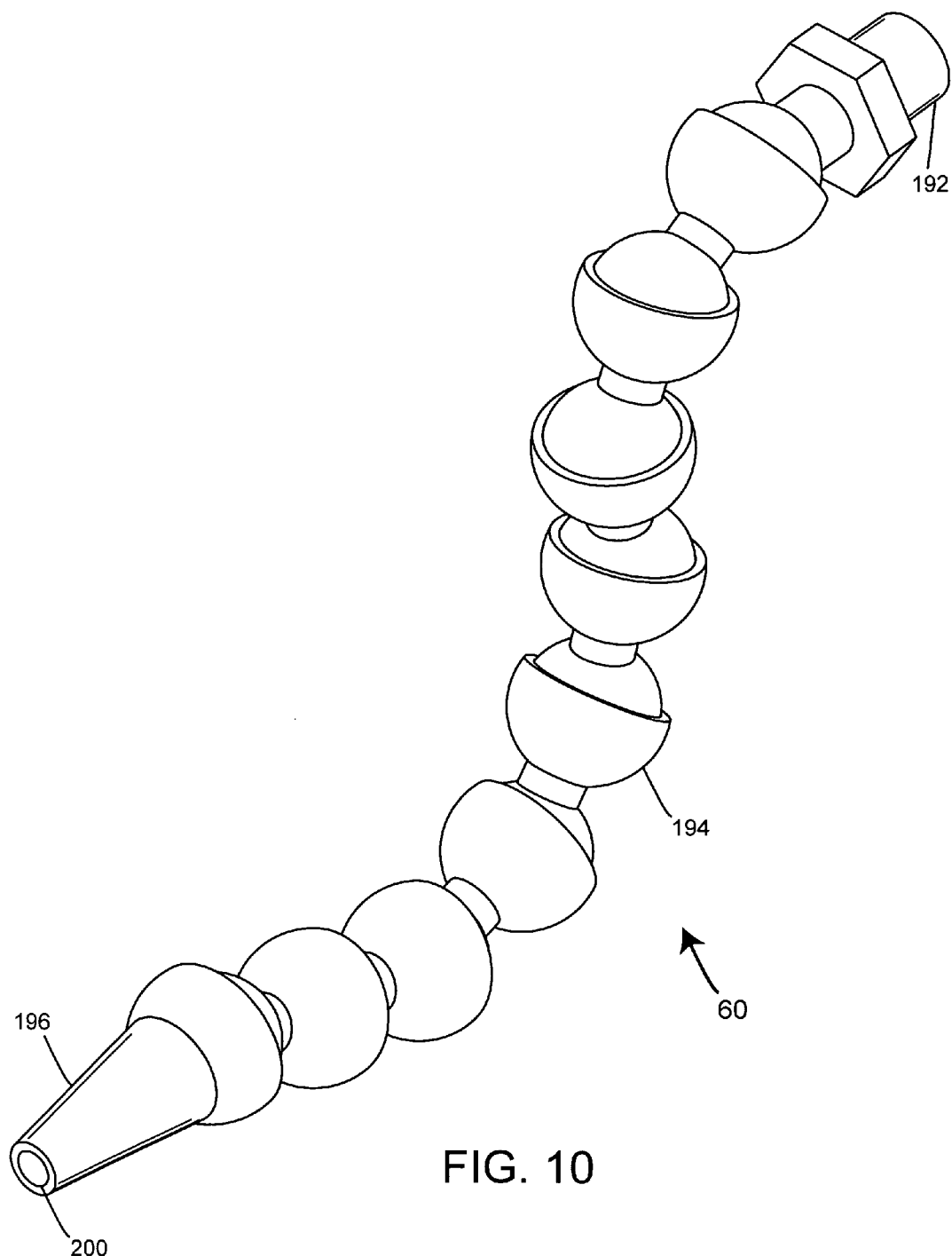
FIG. 10 is a partial side cross sectional view of the preferred embodiment of the present invention illustrating an elongate tubular member connected to a second end of an outlet piping.

In a second alternative configuration of directionally emitting means as incorporated into the manifold assembly, which in particular excludes utilization of the nozzle heads described above, the manifold assembly comprises an elongate tubular member 72 having an inlet fitting 74 hydraulically attached and extending perpendicularly thereto and a plurality of orifices 76 being positioned about an outer face 78 thereof to directionally emit the aqueous cleaning solution into the interior chamber, substantially as shown in FIGS. 8 and 9. Assembly of the elongate tubular member to the second end 50b of the outlet piping is accomplished by a sleeve 80 having a first end 82 fixedly attached thereto and a second end 84 having at least two concentric depressions 86 for accepting therein an equivalent number of o-rings 88. As illustrated in FIG. 10, a free end 90 of the inlet fitting 74 is slidably positioned onto and over the second end 84 and moved thereabout until the o-rings are completely encased within the inner confines of the inlet fitting. Each orifice 76 situated about the outer face 78 is preferably shown to comprise a wall 92 having an anterior portion 94a thereof extending perpendicular thereto and a posterior portion 94b extending angularly outward a predetermined amount from a midpoint position 94c in the wall, specifically where the anterior portion terminates within the confines of the wall.

Figure 11:
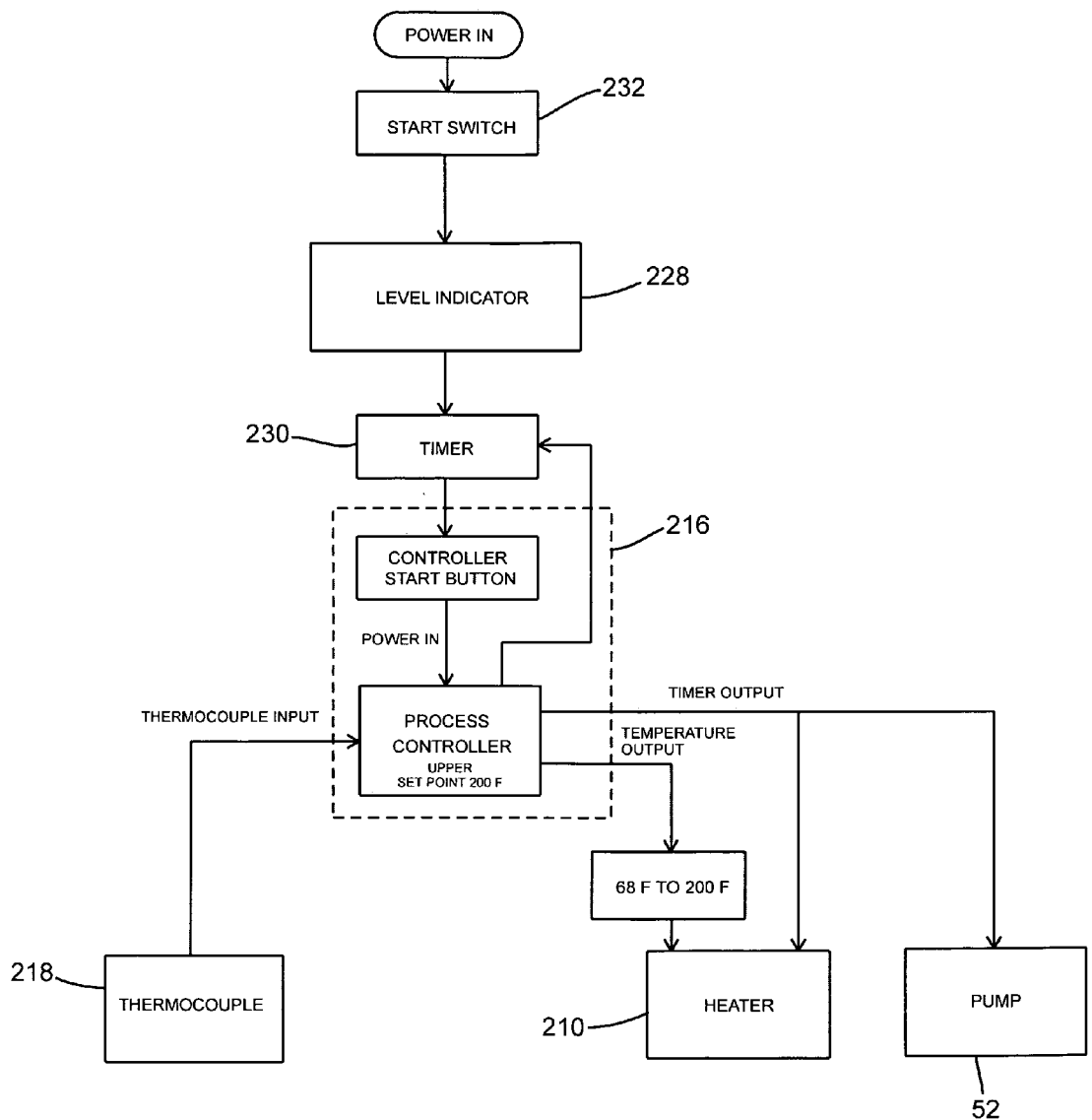
FIG. 11 is a partial side cross sectional view of the preferred embodiment of the present invention illustrating a pressurized cavity having an inlet port slidably engaged over an end of an inner sleeve threadably attached to a threaded coupling.

In a third alternative configuration of directionally emitting means as incorporated into the manifold assembly, particularly as depicted in FIG. 11, the manifold assembly comprises a pressurized cavity 96 having a back side 98 configured with an inlet port 100 extending outwardly therefrom and a front side 102 comprising a plurality of orifices 104 selectively situated thereabout to directionally emit the aqueous cleaning solution into the interior chamber. Similar to the preferred and first alternative configurations of the manifold assembly, notably in terms of connectivity, the third configuration utilizes a threaded coupling 106 having a first end 106a threadably attached to the second end of outlet piping and a second end 106b threadably attached to first end 108a of an inner sleeve 108. Further, the inner sleeve is preferentially shown in FIG. 11 to comprise an outer surface 108c having at least one concentric depression 110 extending inwardly therefrom for receiving an o-ring 112, which primarily serves to seal and partially retain the connection in between a second end 108b of the inner sleeve and inlet port 100. In further respects, the orifice 76 configuration specified for the outer face of the elongate tubular member 72, as particularly described above and illustrated in FIG. 8, is equally suited for adaptation to that specified for the front side 102 of the pressurized cavity.

Referring now to FIG. 2, the second end 48b of the intake piping 48 comprises a basket strainer 114 having a plurality of apertures 116 extending therethrough for passage of the aqueous cleaning solution during cyclic circulation thereof while effectively eliminating the passage of one or more small rapid prototype parts and residual support material suspended in solution. A backing plate 118 fixedly attached to the basket strainer and having a threaded coupling 120 fixedly attached thereto suitably serves as means for mounting the strainer basket to the second end of the intake piping, substantially in the manner shown in FIG. 2. To further mitigate undesirable interaction of one or more small rapid prototype parts in suspension with the manifold assembly 56 and basket strainer, where positive and negative pressure is respectively observed, the retention tank 20 is further shown to comprise means for separably dividing the interior chamber 28 into first and second compartments 122, 124.

As first means for separably dividing the interior chamber, the retention tank is fitted with a fixed jet plate 126 of the particular type shown in FIG. 2, substantially of which comprises an upper leading edge 128 and a plurality of fluid passage apertures 130 extending therethrough to accommodate an equivalent number of nozzle heads 58 and/or articulating arms 60 for sustained and continued passing of the aqueous cleaning solution into the second compartment 124 of the interior chamber 28. Mounting of the fixed jet plate within the interior chamber is substantially accomplished by attaching the upper leading edge 128 to a portion of a work surface 132 suitably situated above and attached to the retention tank. All unattached edges of the fixed jet plate are selectively positioned away from the tank's walls 22 and base a predetermined distance to form an elongate opening 134 therealong, purposefully to maintain circulation of the aqueous cleaning solution contained within the interior chamber of the retention tank. To enhance circulation of the aqueous cleaning solution to a greater extent than that provided by the elongate opening, the fixed jet plate 126 further comprises a plurality of openings 126a collectively positioned near the bottom thereof adjacent to the base 26. Preferably each opening is sized accordingly to hinder movement of most rapid prototype parts from the second compartment into the first compartment, toward the basket strainer 114, predominately of which is caused by the presence of negative pressure thereat.

Figure 12:
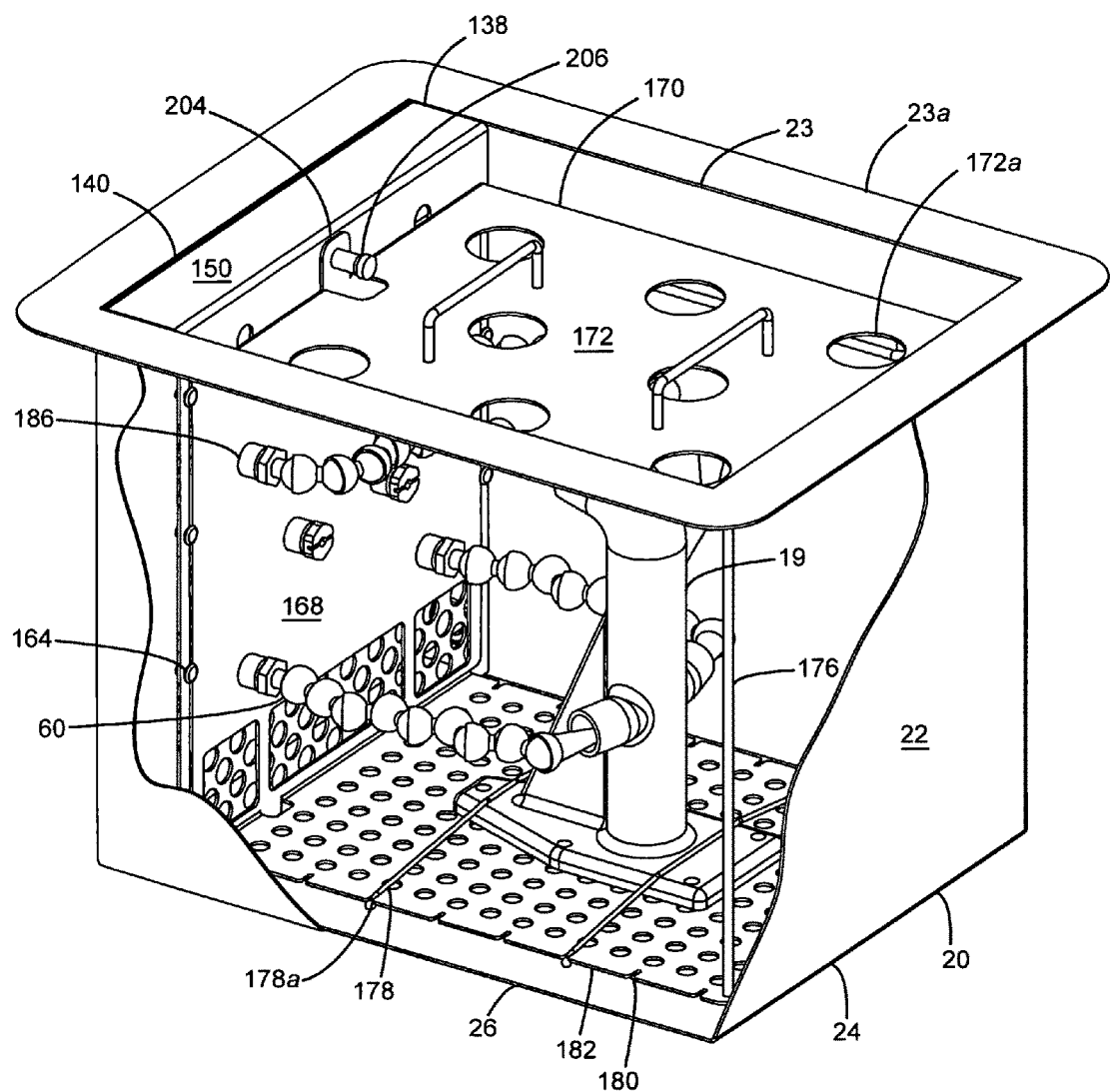
FIG. 12 is a perspective view of the preferred embodiment of the present invention illustrating a parts enclosure situated within the confines of a second compartment of a retention tank as partially formed by a removable jet plate.

As second means for separably dividing the interior chamber, the retention tank is adaptably fitted with a removable jet plate 136 of the particular type shown in FIG. 12, preferentially comprising a topmost supporting member 138 selectively arranged to engage with and connect to an upper inner wall portion 140 of the retention tank and a plurality of legs 142 extending downwardly from a lowermost edge 144 thereof to engage the base 26 of the retention tank 20. Like the fixed jet plate 126 in terms of structure and function, the removable jet plate 136 comprises a plurality of fluid passage apertures 146 to permit uninterrupted flow of the aqueous cleaning solution from the manifold assembly into the second compartment and a plurality of lowermost openings 148 selectively arranged in proximity to the basket strainer 114 to further advance circulation of the aqueous cleaning solution within the interior chamber and mitigate migration of one or more rapid prototype parts from the second compartment into the first compartment 122.

Figure 13:
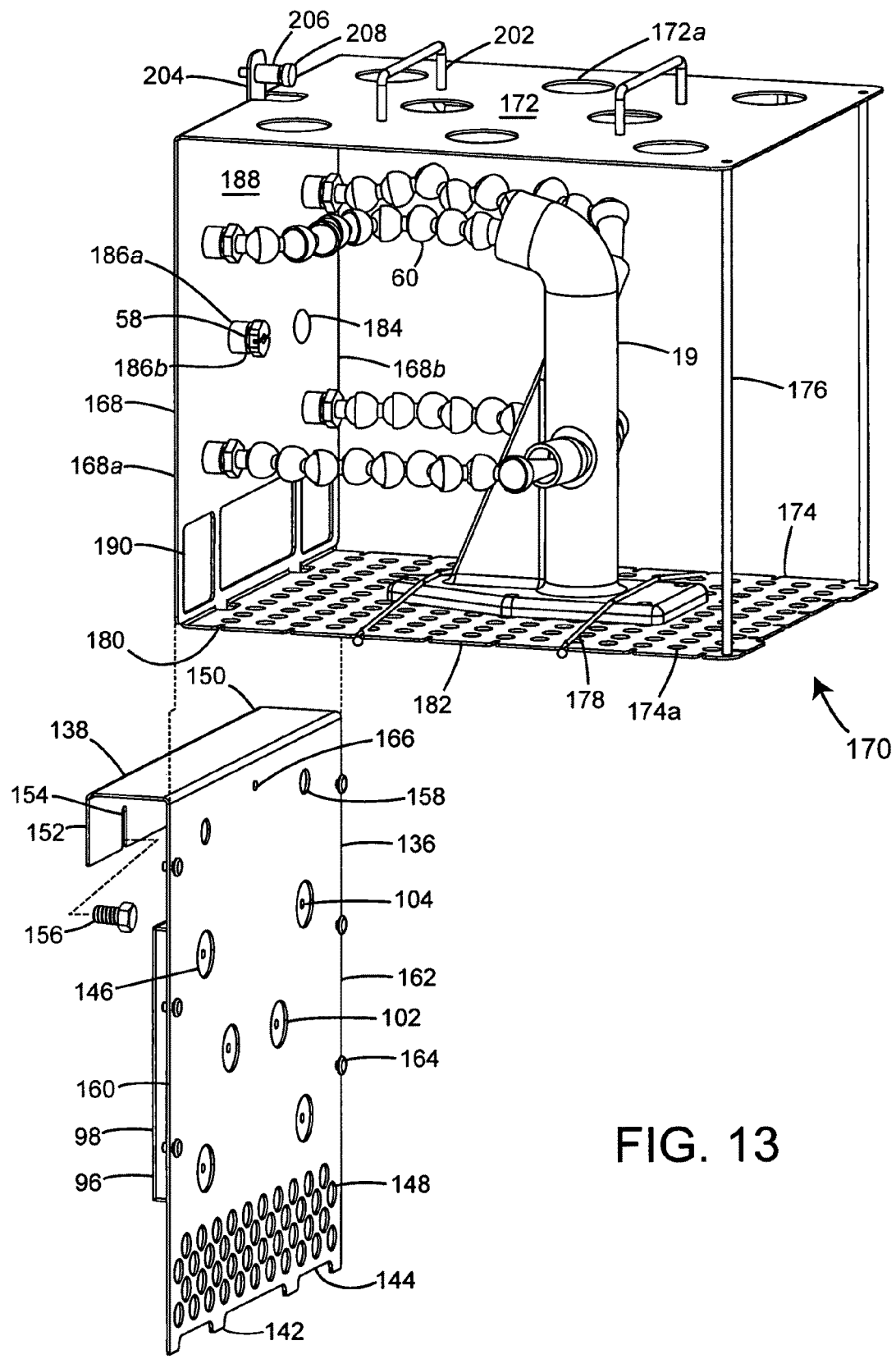
FIG. 13 is a perspective view of the preferred embodiment of the present invention illustrating a parts enclosure and a removable jet plate with a pressurized cavity fitted therewith.

As illustrated in FIG. 13, the topmost supporting member 138 is further shown therein to comprise a horizontal support extension 150 integrally connected to a downwardly hanging extension 152 having one or more slots 154 for accepting means for fastening the downwardly hanging extension to the upper inner wall portion 140 of the retention tank. In order to gain access to the mounting screws 156, sufficing as fastening means, in such manner shown in FIG. 13, the removable jet plate 136 is further configured with access holes 158 each being in directional alignment with the slot 154. Referring now to FIGS. 12 and 13, the removable jet plate is depicted therein with leftward and rightward side portions 160, 162 each comprising a plurality of outward extending members 164 and at least one pin receiving aperture 166 being positioned in between the leftward and rightward side portions and in proximity to the topmost supporting member 138. The outward extending members 164 in this regard serve to engagingly secure the removable jet plate 136 to an interface plate 168 of a parts enclosure 170, which is shown in FIG. 12 to comprise a volumetric capacity sufficiently suited to hold and retain one or more rapid prototype parts 19 therewithin. The parts enclosure is preferentially shown to comprise top and bottom surfaces 172, 174 each having a plurality of perforations 172a, 174a extending therethrough to mitigate buoyancy of the parts enclosure and minimize volumetric displacement of the aqueous cleaning solution as the parts enclosure 170 is being placed within the confines of the second compartment 124 filled aqueous cleaning solution. A combination of supportive posts 176 and the interface plate 168 functionally serve in supporting the top surface 172 above the bottom surface 174 in such manner to create a supportive, protective enclosure for one or more rapid prototype parts. It is noted herein that any number of methodologies may be employed in securing and anchoring any requisite number of rapid prototype parts to the bottom surface, such as that of overlapping a select portion of the rapid prototype part with one or more elastic strapping members 178 each being configured with ends 178a to engage notches 180 of the type present along a sideward edge 182 of the bottom surface 174, as particularly illustrated in FIG. 12. The interface plate 168 is further shown in FIG. 13 to comprise a plurality of port openings 184 configured to align with the fluid passage apertures of the removable jet plate, with each of the port openings being fixedly fitted thereover with a coupling 186 having an end 186a welded to an outward surface 188 of the interface plate. A set of lowermost openings 190 is included within the structure of the interface plate to maintain flow of the aqueous cleaning solution in between the first and second compartments while the parts enclosure is positioned and placed within the second compartment 124 of the interior chamber. Opposite the attached, welded end of each coupling 186 is a threaded end section 186b that is adaptably suited to threadably receive the threaded body section 68 of the nozzle head or a threaded end portion 192 of the articulating arm 60.

Figure 14:
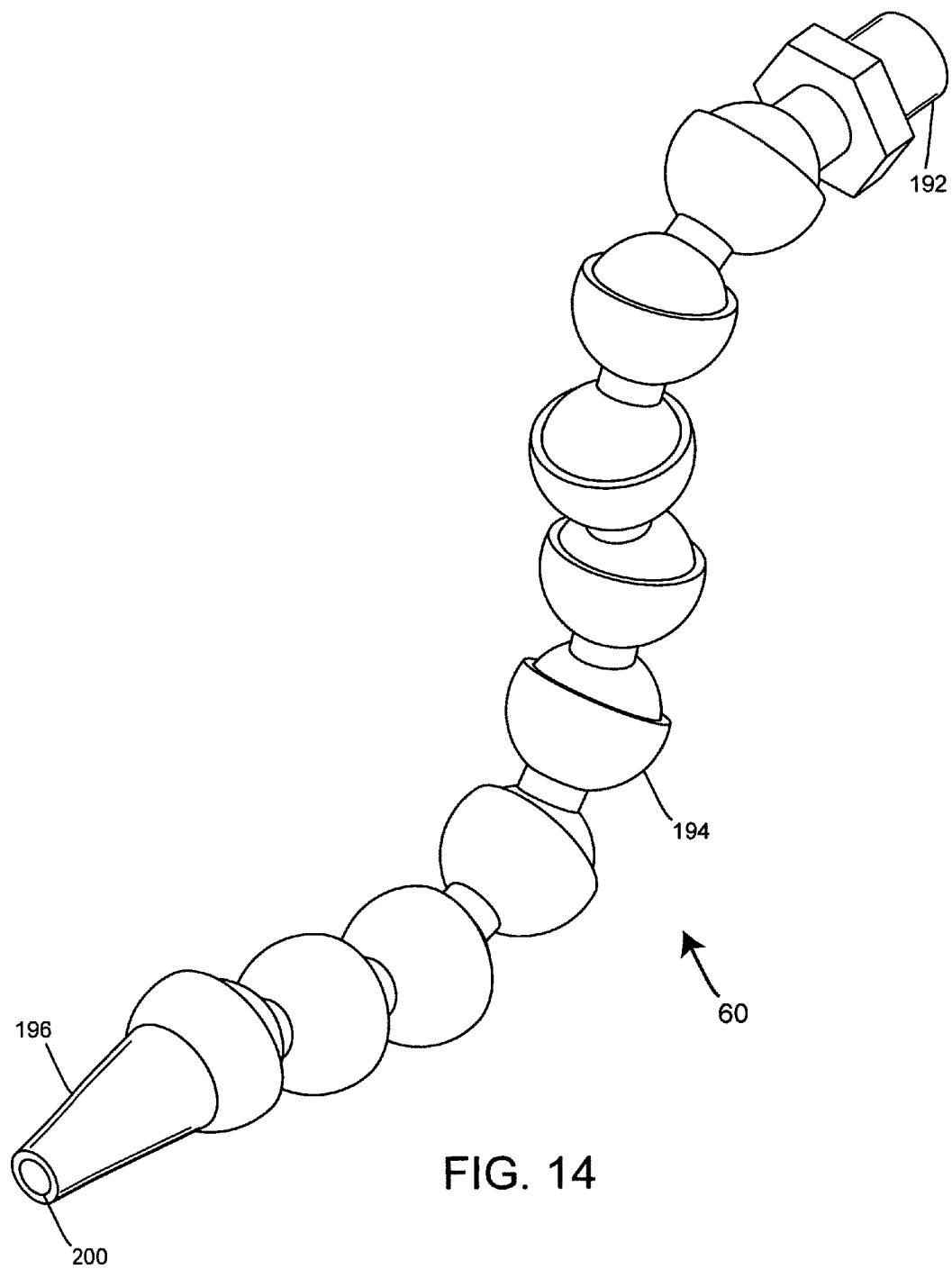
FIG. 14 is a perspective view of the preferred embodiment of the present invention illustrating an articulating arm with a plurality of movable interlocking segments.

As depicted in FIG. 14, the articulating arm is configured with a plurality of movable interlocking segments 194 situated in between and connected to a conical tip section 196 and the threaded end portion 198. The articulating arm 60 in this strict application serves as means for reaching and accessing the interstitial areas and spaces that may be present within the configuration of one or more rapid prototype parts 19, particularly to achieve effective and complete removal of the water-soluble support material therefrom. Similar to the nozzle tip discussed above, the conical tip section 196 comprises an orifice 200 having a diameter ranging from 0.05 to 0.625", which sufficiently establishes the preferred tight dispersion pattern noted hereinabove. As shown in FIG. 12, the top surface 172 of the parts enclosure 170 is further configured with at least one handle 202 mounted thereto to serve as means for placing and removing the parts enclosure within and from the second compartment 124, respectively, and an upwardly extending flange 204 for mounting thereto a spring-operated latch assembly 206 that is adaptably configured with a sliding pin 208 to slidably fit within the pin receiving aperture 166 for secure positioning of the parts enclosure to the removable jet plate 136, in addition to the structural arrangement of the outward extending members 164 slidably engaging left and right leading edges 168a, 168b of the interface plate.

In furthering the removal of water-support material from one or more rapid prototype parts 19 by means of agitation, the retention tank 20 is configurably fitted with means for heating the aqueous cleaning solution to a preferred temperature range of 68 ° F.-200° F., preferably comprising a heating element 210 of the type shown in FIG. 4. The heating element is shown to comprise an internal end 212 situated within the interior chamber and an external end 214 electrically connected to an output line of a microprocessor 216. As further shown in FIG. 4, the heating element is mounted adjacent to the base in the first compartment 122, specifically being positioned most near the wall where the manifold assembly 56 and basket strainer are located to facilitate distribution of heat to the aqueous cleaning solution by the circulatory action of the pump 52. Although numerous types of heating elements may be suited for this application, it is preferred that the heating element 210 comprise a watt density ranging from 50-350 Watts/sq. in., a specified range of which substantially heats the aqueous cleaning solution to the preferred temperature range of 68° F.-200° F. within a modest time range of at least 15-90 minutes, respectively. The heating element may comprise a variety of geometric configurations and design features such as those having an internal end selectively shaped as a band, cable, tubular cartridge, strip, to name a few most widely known and available in the art, providing each meets the above operating specifications. It is understood that with each geometric configuration of the heating element noted above, variations of the watt density may be realized to the extent of falling at the lower or upper limits of the preferred range noted above. It is noted herein that the present invention may alternatively comprise a heating element mounted externally to the retention tank in lieu of the heating element mounted internally in the interior chamber. In such instance, the retention tank primarily serves as a suitable conductor in transmitting heat to the aqueous cleaning solution. In similar regard in terms of substantiating the number of nozzle heads 58, a retention tank comprising a larger volumetric capacity may necessitate a heating element having a higher heatable surface area and output to maintain the overall effectiveness of the aqueous cleaning solution. Given the operating characteristics of the aqueous cleaning solution in terms alkalinity, the internal end preferably comprises a sheath fabricated from materials such as stainless steel 304 or 316, Inconel, Incoloy, Monel, or titanium, collectively of the type capable of resisting premature failure of the heating element during operative conditions.

Working in conjunction with the heating element, a thermocouple 218 is mounted to the retention tank 20 for which serves as means for measuring the temperature of the aqueous cleaning solution to establish the preferred operating temperature range noted hereinbefore. As depicted in FIG. 4, the thermocouple comprises an external lead 220 electrically connected to the input side of the microprocessor 216 and an internal probe 224 extending inwardly within the first compartment 122 for which is readily capable of measuring the ambient temperature of the aqueous cleaning solution and making timely and minute adjustments to the heating element 210 via the microprocessor. Like the heating element in terms of material choice, the internal end preferably comprises a sheath 226 fabricated from or coated with a material most compatible for operation in a corrosive environment. It is noted herein that the present invention may utilize, other than the thermocouple noted above, various means for measuring the ambient temperature of the aqueous cleaning solution, such as that provided by resistive temperature devices (RTDs and thermistors) and bimetallic devices, to name a couple known and available in the art. Furthermore, it is contemplated within the scope and configuration of the present invention that alternative means for controlling heat inputs to establish the preferred operating temperatures may be provided other than through the use of the combined operative features and cooperative functionally of the thermocouple and microprocessor, controllers of which are derivatively based on on/off control; proportional control, which is designed to eliminate the cycling associated with on-off control; proportional with integral and derivative control (PID); and fuzzy logic. In the instance of their use, its is understood that the controller is preprogrammed at a preferred temperature set point, differential, and/or heating mode that selectively maintains the ambient temperature of the aqueous cleaning solution within the preferred noted range.

Figure 15:
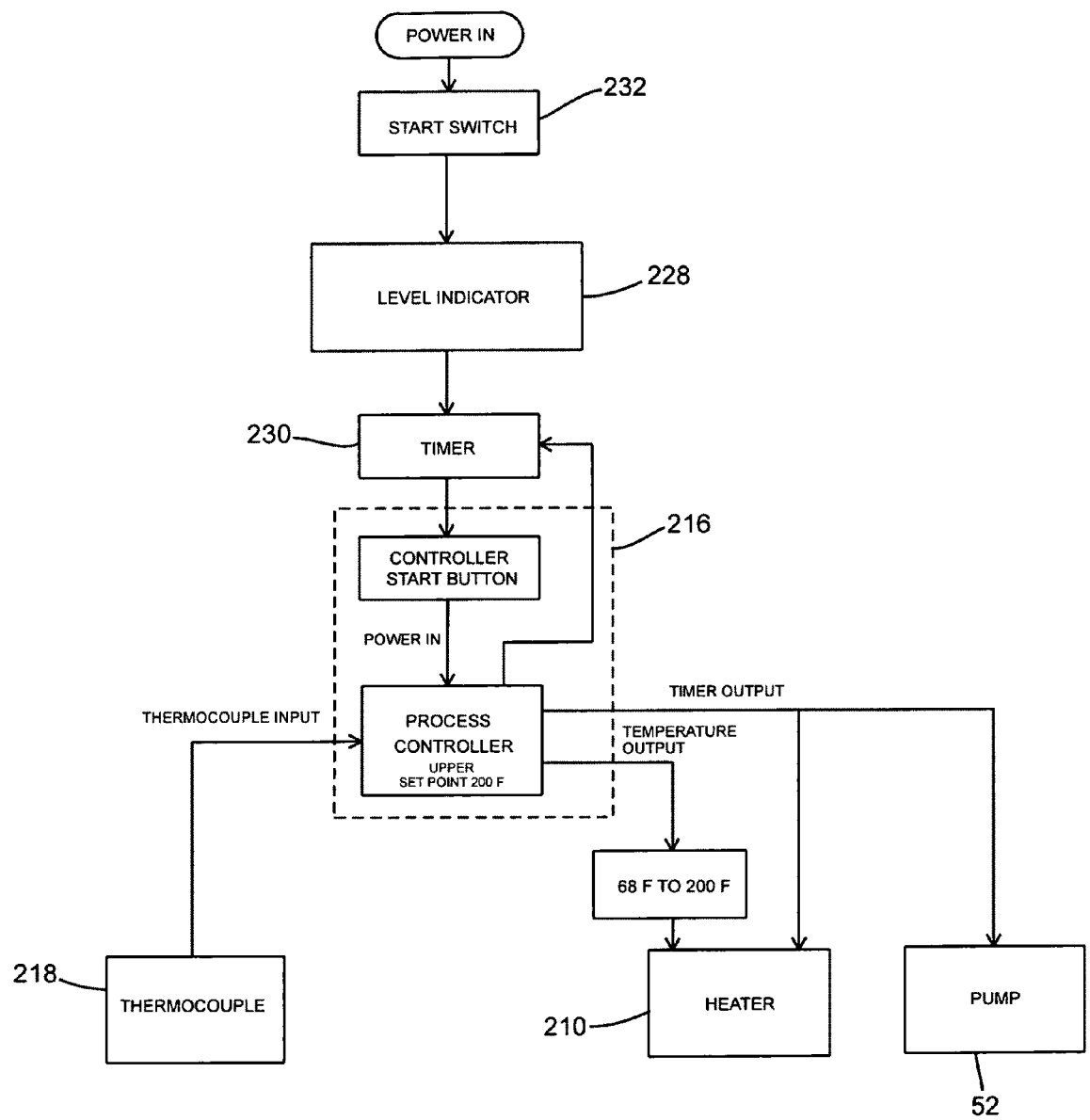
FIG. 15 is a flow diagram of the preferred embodiment of the present invention illustrating a microprocessor communicatively coupled to a thermocouple, pump, heating element, and level indicator.

In addition to the available means for heating and agitating the aqueous cleaning solution, a level indicator 228 of the type shown in FIG. 4 provides means for monitoring aqueous cleaning solution levels and activating power to and enabling startup functions of the microprocessor in such manner to permit activation of a timer switch 230, which correspondingly controls the duration of operating the heating element and pump 52. In further regards, the level indicator suitably serves as a safety device insofar of eliminating premature activation of the pump when the interior chamber 28 is absent of aqueous cleaning solution. Level indicators comprising operable features of optics, magnetic, mechanical means, to name a few commonly available in the art, may be suited for this application providing each comprises means for connectivity to the microprocessor 216. As illustrated in FIG. 15, the microprocessor selectively controls outputs to the pump and heating element operably based on time and temperature set points established by the operator or manufacturer. In the preferred embodiment, a temperature set point of approximately 200° F., as set by the manufacturer, establishes optimal performance of the aqueous cleaning solution. Time input, on the other hand, is selectively controlled by the user via the interface controller 16 comprising means for displaying operating variables of temperature and time. An example of a suitable microprocessor for this application is the type manufactured by the Watlow Company of St. Louis, Missouri, specifically being designated as Watlow Series 935B. It should be understood that many other types of microprocessors may be used in this application providing it comprises capabilities to control the desired outputs noted above. It is further understood that all electrical components described above, including the pump, heating element, thermocouple, level indicator and microprocessor, may be electrically wired in any known manner. In operation, with reference to FIG. 15, power is initially supplied to a start switch 232 which subsequently activates the level indicator 228. Upon the level indicator detecting the level of the aqueous cleaning solution in the retention tank, power is further transmitted to the microprocessor 216 at which time the timer is activated by the operator to set the temporal limits for operating the pump 52 and heating element 210. Process startup is finally achieved by the operator activating a controller start button integrally made part of the microprocessor. It is noted herein that the heating element only operates within a temperature range of approximately 68° F. to the set point of 200° F. notwithstanding the time inputs, in contrast to the pump 52 which operates for the full duration of the time input. Upon expiration of the timer's set limits, power to the pump as well as the heating element is disabled via the microprocessor 216. Reactivation of the cleaning cycle substantially involves re-setting the timer function and activating the controller start button.

Figure 5:
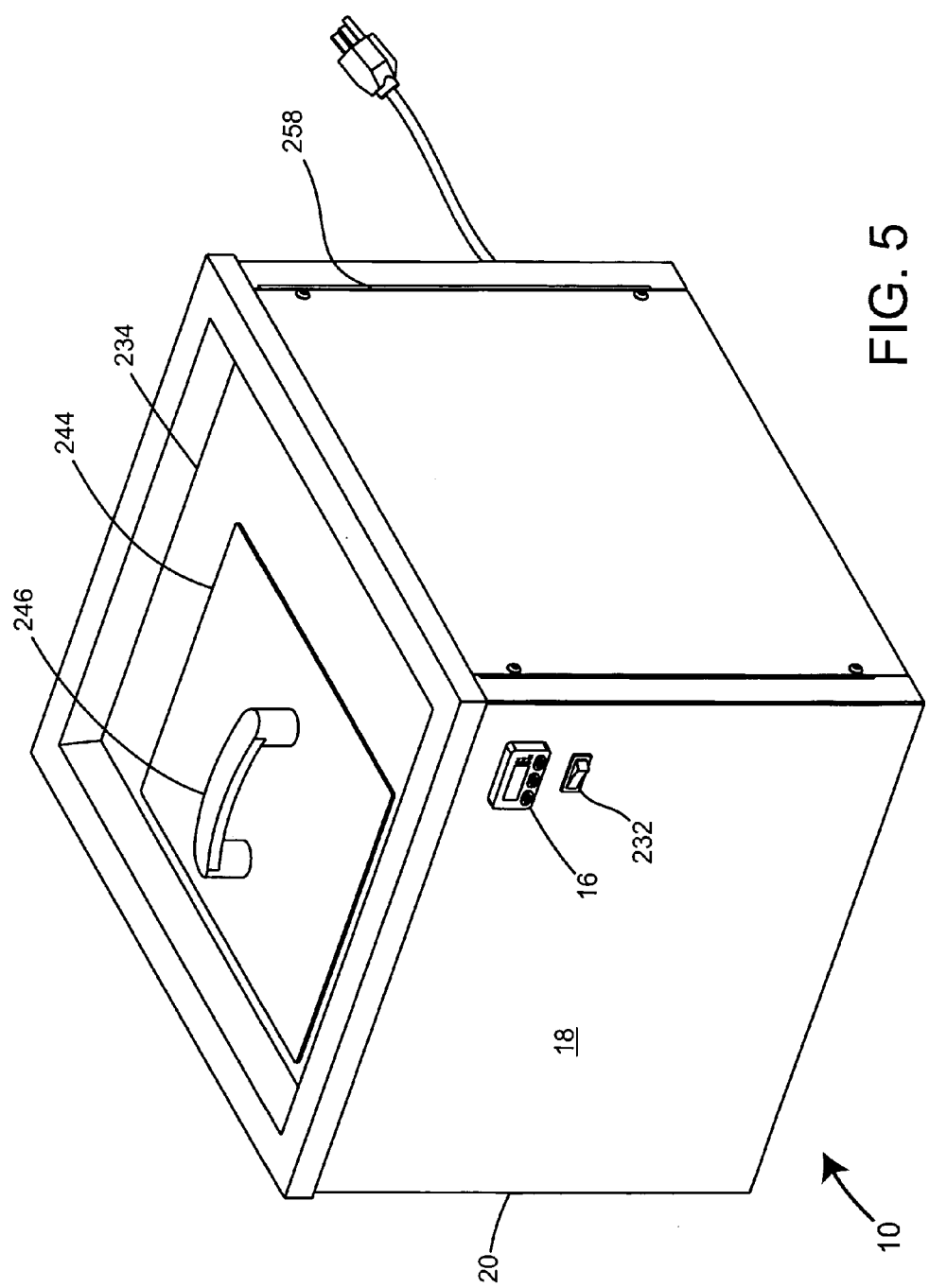
FIG. 5 is a perspective view of the preferred embodiment of the present invention illustrating a support removal apparatus equipped with a lid.

Referring now to FIG. 2, the retention tank 20, in lieu of the outward extending flange 23a denoted for general purpose installations, is fitted with an integral work surface 234 of the type comprising a recessed portion 236 having an opening 238 extending therethrough, collectively being contained within an upper ledge 240 extending along the perimeter of the work surface. The work surface, particularly the recessed portion, assists in containing and channeling the aqueous cleaning solution downwardly toward the retention tank in the event of inadvertent spillage caused by the removal of rapid prototype parts from the second compartment 124. As illustrated in FIGS. 1 and 3, the opening preferably comprises a geometric configuration and size substantially conforming to an accessible opening 242 of the second compartment. To mitigate further loss of aqueous cleaning solution, primarily due to evaporation, the work surface further comprises a lid 244 having a geometric configuration substantially conforming to the opening 238 of the recessed portion and a handle 246 fixedly attached to an upper surface 248 thereof to provide means for removing and placing the lid onto and over the accessible opening 242. In some applications, the lid, as shown in FIG. 1, is adaptably fitted with a basket 250 hanging downwardly therefrom for holding small rapid prototype parts which easily suspend in solution and readily move about the interior chamber 28. In this regard, the basket comprises perforated walls 252 substantially arranged to form an interior portion 254 capable of containing the rapid prototype parts yet permitting the passing of aqueous cleaning solution upon removal from the retention tank. Preferably, the basket 250 comprises an overall geometric configuration substantially capable of fitting within the confines of the second compartment 124 and passing unhindered through the opening 238 of the recessed portion. Access to the basket is made possible by a parts opening 256 extending through one of its perforated walls 252 and when placed within the interior chamber 28, the parts opening abuts up against the sidewall 22 of the retention tank to impede outgoing flow of rapid prototype parts into the interior chamber. As illustrated in FIGS. 1 and 5, the cabinet 14 further comprises features for operation and maintenance, including an access panel 258 removable therefrom to gain access to the pump 52 and other operable components and, as noted earlier, an interface controller display and the start switch 232 mounted externally on the cabinet. In most applications, the integral work surface 234 is welded to the retention tank and collectively placed into and attached to the cabinet by a plurality of screws.

It can be seen from the foregoing that there is provided in accordance with this invention a simple and easily operated device, which is particularly suited to operate side-by-side with a rapid prototype parts making machine in an office setting or similarly suited environment. The support removal apparatus 10 is completely functional in removing water-soluble supports most efficiently from rapid prototype parts 19 given optimum operability in terms of aqueous cleaning solution type and concentration, agitation, and temperature.

It is obvious that the components comprising the support removal apparatus may be fabricated from a variety of materials, providing such selection or use of materials possess the capacity to withstand premature corrosion given the presence and use of an alkaline aqueous cleaning solution, notably falling within an applicable pH range of 8-11. Accordingly, it is most desirable, and therefore preferred, to construct the retention tank 20, work surface 234, lid 244, parts enclosure 170, basket, fixed and removable jet plates 126, 136, and nozzle heads 58 from 316 stainless steel; pipe and fittings from a polymeric material such as polyamide (PA) or acrylonitrile-butadiene-styrene (ABS); and cabinet 14 from a lower grade stainless steel. It is noted herein that the retention tank, nozzle head, and work surface may be alternatively fabricated from materials to lessen the overall weight of the support removal apparatus yet maintaining sufficient resistance to corrosion, such as polypropylene, polyoxymethylene, polyphenylene, ABS, or PA. Similarly, the pump, thermocouple, heating element, and level indictor, particularly exposed operable components of each, are fabricated from a high grade stainless steel (316) or coated with an impervious, corrosive-resistant material such as epoxy.

While there has been shown and described a particular embodiment of the invention, it will be obvious to those skilled in the art that various changes and alterations can be made therein without departing from the invention and, therefore, it is aimed in the appended claims to cover all such changes and alterations which fall within the true spirit and scope of the invention.

What is claimed is:

1. An apparatus for removing water-soluble support material from one or more rapid prototype parts, said apparatus comprising in combination:
a retention tank having walls and a base collectively forming an interior chamber for containing and storing an aqueous cleaning solution, said base having an aperture extending therethrough and adaptably fitted with a valve for selectively controlling flow of the aqueous cleaning solution from said interior chamber into an external sump collector, said wall having intake and outlet apertures extending therethrough;
intake and outlet piping passing through said intake and outlet apertures of the wall, said intake and outlet piping each having one end attached to intake and outlet sides of a pump and a second end attached to a basket strainer and an inlet port of a pressurized cavity, respectively, said pressurized cavity having a back side and a front side with a plurality of orifices situated thereabout;
means for heating the aqueous cleaning solution contained within said interior chamber to a predetermined temperature range;
means for measuring temperature of the aqueous cleaning solution contained within said interior chamber;
means for controlling said heating means based on inputs transmitted thereto and received from said temperature measuring means to maintain operability within the predetermined temperature range;

a removable jet plate separably dividing said interior chamber into first and second compartments for housing therewithin said pressurized cavity, said heating means and said basket strainer and for receiving therewithin one or more rapid prototype parts, respectively, said removable jet plate having a plurality of fluid passage apertures each being selectively positioned to align with said orifice;

an interface plate having a plurality of port openings each being selectively positioned to align with said fluid passage aperture of the removable jet plate; and a level indicator positioned internally in said first compartment at a predetermined distance above said orifices for transmitting level measurements of the aqueous cleaning solution present in said interior chamber to said controlling means to selectively activate said heating means and said pump for a predetermined time interval as set by a timer.

2. An apparatus as set forth in claim 1, wherein said manifold assembly comprises a threaded coupling having one end thereof threadably attached to said second end of outlet piping, said directionally emitting means comprising an articulating arm having a plurality of movable interlocking segments situated in between and connected to a conical tip section and a threaded end portion threadably attached to a second end of said threaded coupling.

3. An apparatus as set forth in claim 1, wherein said removable jet plate comprises a plurality of lowermost openings selectively arranged in proximity of said basket strainer and said heating means to yield effective circulation of the aqueous cleaning solution within said interior chamber for uniform heat transfer while simultaneously inhibiting the passage of one or more rapid prototype parts into said first compartment from said second compartment.

4. An apparatus as set forth in claim 3, wherein said removable jet plate comprises a topmost supporting member for connecting to said wall of the retention tank and a plurality of legs extending downwardly from a lowermost edge thereof to engage said base of the retention tank.

5. An apparatus as set forth in claim 4, wherein said removable jet plate comprises leftward and rightward side portions each comprising a plurality of outward extending members and at least one pin receiving aperture being positioned in proximity of said topmost supporting member.

6. An apparatus as set forth in claim 5, further comprising a parts enclosure having top and bottom surfaces each comprising a plurality of perforations extending therethrough and being substantially supported above one another by a combination of supportive posts and said interface plate.

7. An apparatus as set forth in claim 6, wherein said interface plate comprises a set of lowermost openings substantially located within the vicinity of said lowermost openings of the removable jet plate to maintain flow of the aqueous cleaning solution in between said first and second compartments.

8. An apparatus as set forth in claim 7, wherein said interface plate comprises left and right leading edges for slidably engaging with said outward extending members upon said interface plate of the parts enclosure being placed within said second compartment of the interior chamber.

9. An apparatus as set forth in claim 6, wherein said top surface of the parts enclosure comprises at least one handle mounted thereto and an upwardly extending flange for mounting thereto a spring-operated latch assembly configured with a sliding pin to slidably fit within said pin receiving aperture.

10. An apparatus as set forth in claim 4, wherein said topmost supporting member comprises a horizontal support extension integrally connected to a downwardly hanging extension having slots for accepting means for fastening said downwardly hanging extension to an inner wall portion of said retention tank, said removable jet plate comprising access holes for accessing fastening means.

11. An apparatus as set forth in claim 1, wherein said port openings of the interface plate are fixedly fitted thereover with couplings each having a threaded end section.

12. An apparatus as set forth in claim 11, further comprising nozzle heads attached to said couplings.

13. An apparatus as set forth in claim 11, further comprising articulating arms attached to said couplings.

14. An apparatus as set forth in claim 13, wherein said articulating arm comprises a plurality of movable interlocking segments situated in between and connected to a conical tip section and a threaded end portion threadably attached to said threaded end section of the coupling 15. An apparatus as set forth in claim 11, further comprising a combination of nozzle heads and articulating arms attached to said couplings.

16. An apparatus for removing water-soluble support material from one or more rapid prototype parts, said apparatus comprising in combination:

a retention tank having walls and a base collectively forming an interior chamber for containing and storing an aqueous cleaning solution, said base having an aperture extending therethrough and adaptably fitted with a valve for selectively controlling flow of the aqueous cleaning solution from said interior chamber into an external sump collector, said wall having intake and outlet apertures extending therethrough;

intake and outlet piping passing through said intake and outlet apertures of the wall, said intake and outlet piping each having one end attached to intake and outlet sides of a pump and a second end attached to a basket strainer and a threaded coupling, respectively, said threaded coupling having a second end threadably attached to a first end of an inner sleeve;

a pressurized cavity having front and back sides and an inlet port extending outwardly from said back side and slidably positioned over an outer surface of the inner sleeve, said front side having a plurality of orifices situated thereabout;

a heating element for heating the aqueous cleaning solution contained within said interior chamber to a predetermined temperature range;

a thermocouple for measuring temperature of the aqueous cleaning solution contained within said interior chamber;

a removable jet plate separably dividing said interior chamber into first and second compartments for housing therewithin said pressurized cavity, said heating means and said basket strainer and for receiving therewithin one or more rapid prototype parts, respectively, said removable jet plate having a plurality of lowermost openings situated below said pressurized cavity and a plurality of fluid passage apertures each being selectively positioned to align with said orifice;

an interface plate having a plurality of port openings each being selectively positioned to align with said fluid passage aperture of the removable jet plate; and a level indicator positioned internally within said first compartment at a predetermined distance above said orifices for transmitting level measurements of the aqueous cleaning solution present in said interior chamber to a microcontroller for selectively activating said heating means and said pump for a predetermined time interval as set by a timer.

17. An apparatus as set forth in claim 16, wherein said removable jet plate comprises a topmost supporting member for connecting to said wall of the retention tank and a plurality of legs extending downwardly from a lowermost edge thereof to engage said base of the retention tank.

18. An apparatus as set forth in claim 17, wherein said removable jet plate comprises leftward and rightward side portions each comprising a plurality of outward extending members and at least one pin receiving aperture being positioned in proximity of said topmost supporting member, said topmost supporting member comprising a horizontal support extension integrally connected to a downwardly hanging extension having at least one slot for accepting therethrough a mounting screw for fastening said downwardly hanging extension to an inner wall portion of said retention tank.

19. An apparatus as set forth in claim 18, further comprising a parts enclosure having top and bottom surfaces each comprising a plurality of perforations extending therethrough and being substantially supported above one another by a combination of supportive posts and said interface plate, said interface plate comprising a set of lowermost openings substantially located within the vicinity of said lowermost openings of the removable jet plate to maintain flow of the aqueous cleaning solution in between said first and second compartments upon said parts enclosure being placed within said second compartment of the interior chamber.

20. An apparatus as set forth in claim 19, wherein said interface plate comprises left and right leading edges for slidably engaging with said outward extending members upon said interface plate of the parts enclosure being placed within said second compartment of interior chamber, said port openings each being fixedly fitted thereover with a coupling having a threaded end section.

21. An apparatus as set forth in claim 20, further comprising articulating arms attached to said couplings, said articulating arm comprising a plurality of movable interlocking segments situated in between and connected to a conical tip section and a threaded end portion threadably attached to said threaded end section of the coupling.

22. An apparatus as set forth in claim 20, further comprising a combination of nozzle heads and articulating arms attached to said couplings, said articulating arm comprising a plurality of movable interlocking segments situated in between and connected to a conical tip section and a threaded end portion threadably attached to said threaded end section of the coupling.

23. An apparatus as set forth in claim 20, further comprising nozzle heads attached to said couplings.

24. An apparatus for removing water-soluble support material from one or more rapid prototype parts, said apparatus comprising in combination:

a retention tank having walls and a base collectively forming an interior chamber for containing and storing an aqueous cleaning solution, said base having an aperture extending therethrough and adaptably fitted with a valve for selectively controlling flow of the aqueous cleaning solution from said interior chamber into an external sump collector, said wall having intake and outlet apertures extending therethrough;

intake and outlet piping passing through said intake and outlet apertures of the wall, said intake and outlet piping each having one end attached to intake and outlet sides of a pump and a second end attached to a basket strainer and one end of a threaded coupling, respectively, said threaded coupling having a second end threadably attached to a first end of an inner sleeve;

a pressurized cavity having front and back sides and an inlet port extending outwardly from said back side and slidably positioned over an outer surface of said inner sleeve, said front side comprising a plurality of orifices situated thereabout;

a heating element for heating the aqueous cleaning solution contained within said interior chamber to a predetermined temperature range;

a thermocouple for measuring temperature of the aqueous cleaning solution contained within said interior chamber;

a removable jet plate separably dividing said interior chamber into first and second compartments for housing therewithin said heating means, said pressurized cavity and said basket strainer and for receiving therewithin one or more rapid prototype parts, respectively, said removable jet plate having a plurality of lowermost openings, a plurality of fluid passage apertures each being selectively positioned to align with said orifice and leftward and rightward side portions each comprising a plurality of outward extending members;

an interface plate having a plurality of port openings each being selectively positioned to align with said fluid passage aperture of the removable jet plate; and a level indicator positioned internally within said first compartment at a predetermined distance above said orifices for transmitting level measurements of the aqueous cleaning solution present in said interior chamber to a microcontroller for selectively activating said heating means and said pump for a predetermined time interval as set by a timer.

25. An apparatus as set forth in claim 24, further comprising a parts enclosure having top and bottom surfaces each comprising a plurality of perforations extending therethrough and being substantially supported above one another by a combination of supportive posts and said interface plate, said interface plate comprising a set of lowermost openings substantially located within the vicinity of said lowermost openings of the removable jet plate to maintain flow of the aqueous cleaning solution in between said first and second compartments, said port openings each being fixedly fitted thereover with a coupling having a threaded end section, said interface plate comprising left and right leading edges for slidably engaging with said outward extending members upon said interface plate of the parts enclosure being placed within said second compartment of the interior chamber.

26. An apparatus as set forth in claim 25, further comprising articulating arms each having a plurality of movable interlocking segments situated in between and connected to a conical tip section and a threaded end portion threadably attached to said threaded end section of the coupling.

27. An apparatus as set forth in claim 26, wherein said removable jet plate comprises a topmost supporting member for connecting to said wall of the retention tank and a plurality of legs extending downwardly from a lowermost edge thereof to engage said base of the retention tank, said topmost supporting member comprising a horizontal support extension integrally connected to a downwardly hanging extension having slots for accepting therethrough mounting screws for fastening said downwardly hanging extension to an inner wall portion of said retention tank.

28. An apparatus as set forth in claim 25, further comprising nozzle heads each threadably attached to said threaded end section of the coupling.

29. An apparatus as set forth in claim 25, further comprising a combination of nozzle heads and articulating arms attached to said couplings, said articulating arm comprising a plurality of movable interlocking segments situated in between and connected to a conical tip section and a threaded end portion threadably attached to said threaded end section of the coupling.

* * * * *